(12) United States Patent
Narayanan et al.

(10) Patent No.: US 12,537,562 B2
(45) Date of Patent: Jan. 27, 2026

(54) COMPACT HANDHELD INTEGRATED CABLING ASSIST DEVICES AND ASSOCIATED METHODS

(71) Applicant: DELL PRODUCTS L.P., Round Rock, TX (US)

(72) Inventors: Padmanabhan Narayanan, Redmond, WA (US); Ming Chung Chow, Pleasanton, CA (US); Vamshidhar Varre, Telengana (IN)

(73) Assignee: DELL PRODUCTS L.P., Round Rock, TX (US)

( * ) Notice: Subject to any disclaimer, the term of this patent is extended or adjusted under 35 U.S.C. 154(b) by 697 days.

(21) Appl. No.: 17/861,117

(22) Filed: Jul. 8, 2022

(65) Prior Publication Data

US 2024/0014856 A1 Jan. 11, 2024

(51) Int. Cl.
*H04B 5/72* (2024.01)
*H05K 5/02* (2006.01)

(52) U.S. Cl.
CPC ............ *H04B 5/72* (2024.01); *H05K 5/0247* (2013.01)

(58) Field of Classification Search
CPC .............................. H04B 5/72; H04K 5/0247
USPC ........................................................ 455/41.1
See application file for complete search history.

(56) References Cited

U.S. PATENT DOCUMENTS

2017/0163573 A1* 6/2017 Lawson .................. H04L 49/40
2018/0035505 A1* 2/2018 Foster ................. H04L 12/2836
2018/0259722 A1* 9/2018 Raza ..................... G02B 6/3885

* cited by examiner

*Primary Examiner* — Eugene Yun
(74) *Attorney, Agent, or Firm* — BAUGH LAW, LLC

(57) ABSTRACT

Presented herein are embodiments of a compact handheld integrated cabling assist (CHICA) device that has a form factor of a transceiver. In one or more embodiments, a CHICA embodiment may pair with a cabling assist application (CA-App) to guide a user with cabling decisions. A user may insert a transceiver (optic/DAC) in a mini-cage of the CHICA, wherein the CHICA reads the transceiver data, transmits the data to the CA-App to confirm that the transceiver meets the configuration requirements of the switch port. In one or more embodiments, a user may also interact with the CA-App to write data (e.g., EEPROM fields) to the transceiver by issuing commands via the CHICA device.

20 Claims, 10 Drawing Sheets

COMPACT HANDHELD INTEGRATED CABLING ASSIST DEVICES AND ASSOCIATED METHODS

BACKGROUND

A. Technical Field

The present disclosure relates generally to information handling systems. More particularly, the present disclosure relates to assisting with the physical connections between information handling systems to provide a fabric or network.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices (e.g., switch devices), server devices, storage system, and/or other computing devices known in the art, may be provided in a fabric in order to allow for the transfer of information between those computing devices. It is desirable to design and deploy/update fabrics as quickly as possible, and several techniques for fabric provisioning have been developed to achieve those goals. For example, fabric management systems such as the Fabric Design Center (FDC) from DELL® Inc. of Round Rock, Texas, United States, automates many of the operations involved in the creation of a complete fabric plan (e.g., switch/server/storage rack placements, configurations, connectivity, cabling details, and/or other fabric information known in the art), and Zero Touch Provisioning (ZTP) techniques automate many of the operations involved in the verification of that fabric plan once the computing device have been connected together.

As will be appreciated by one of skill in the art, the fabric plan discussed above may identify transceiver devices for ports on switch devices (e.g., based on switch/port configurations/capabilities), copper or optical cabling for connecting switch devices to other devices in the fabric (e.g., while considering "breakout" modes, distance between connected peer computing devices, etc.), direct-attach cables (e.g., active or passive Direct-Attach Copper (DAC) cables and/or Active Optical Cables (ADCs)) for connecting switch devices to other devices in the fabric (e.g., while considering "breakout" modes, distance between connected peer computing devices, etc.), and/or other fabric plan information known in the art, and may be utilized to generate a respective "job plan" for each fabric connection technician involved in the connection of the computing devices to provide the fabric.

Those fabric connection technicians may then operate according to their respective job plans to connect the computing devices to provide the fabric. And, once those job plans have been carried out by the fabric connection technicians, the fabric connections may be automatically verified (e.g., using Link Layer Discovery Protocol (LLDP) communications and verification scripts). As such, while fabric creation and fabric connection verification are substantially automated, the actual connection of the computing devices in the fabric remains a manual operation. Furthermore, while fabric administrators tend to have relatively extensive knowledge of the computing devices (e.g., Command Line Interface (CLI) operations and other tools that allow for the performance of validation/troubleshooting) and the fabric connection options (e.g., 1G to 400G transceiver devices and corresponding cabling options, direct-attach cabling options, breakout modes, port configurations that may affect link status, etc.), the fabric connection technicians that are relied upon to actually physically connect the computing devices to provide the fabric according to their respective job sheets tend to lack that level of knowledge.

In addition, those fabric connection technicians often operate in a time-constrained and physically-constrained environment that presents further challenges with the connection of the computing device in the fabric. For example, the fabric connection component inventory is typically not co-located with the computing device(s) being connected, which requires the fabric connection technician to identify and collect the relevant transceiver devices/corresponding cabling and/or direct-attach cabling (e.g., in a "crash cart") before transporting them to the location of the computing device(s) to-be connected. Furthermore, in some cases, switch devices positioned at the top of a rack may only be accessible via a ladder, while switch devices positioned at the bottom of a rack may present difficulties as well. Further still, the ability to accurately identify computing devices, ports, transceiver devices/corresponding cables, direct-attach cabling, and/or other fabric connection components may be difficult due to light pollution, poor lighting, lack of clear/visible information on the computing devices, fabric connection component identifiers (e.g., Quick Response (QR) codes or bar codes) not being accompanied by descriptions, discrepancies between network operating system port number schemes and the port numbering printed on the switch devices, and/or other issues that would be apparent to one of skill in the art. Yet further still, during the fabric connection process, fabric connection technicians may perform voice calls with fabric administrators while having to carry transceiver devices/corresponding cabling and/or direct-attach cabling, which often precludes the use of relatively large mobile devices (e.g., laptop/notebook computing devices) or tethered devices (e.g., desktop computing devices) that would reduce fabric connection technician agility.

Thus, the manual operations combined with the challenging fabric connection environment makes conventional fabric connection technique error-prone, and may result in links between computing devices not being available due to fabric connection issues. For example, common fabric connection errors include the incorrect selection of direct-attach cabling or a transceiver device and/or corresponding cable, the connection of a correctly selected transceiver device or direct-attach cable in an incorrect port or an incorrect switch device, incorrectly seated direct-attach cabling connectors, transceiver devices, or corresponding cables, switch port/cage issues, faulty direct-attach cabling, transceiver devices, or corresponding cables, configuration mismatches, and/or other fabric connection issues that may then require subsequent fault isolation procedures and further manual intervention by a fabric connection technician or fabric administrator to remedy the issue.

Accordingly, it is highly desirable to provide a fabric connection system that addresses the issues discussed above.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
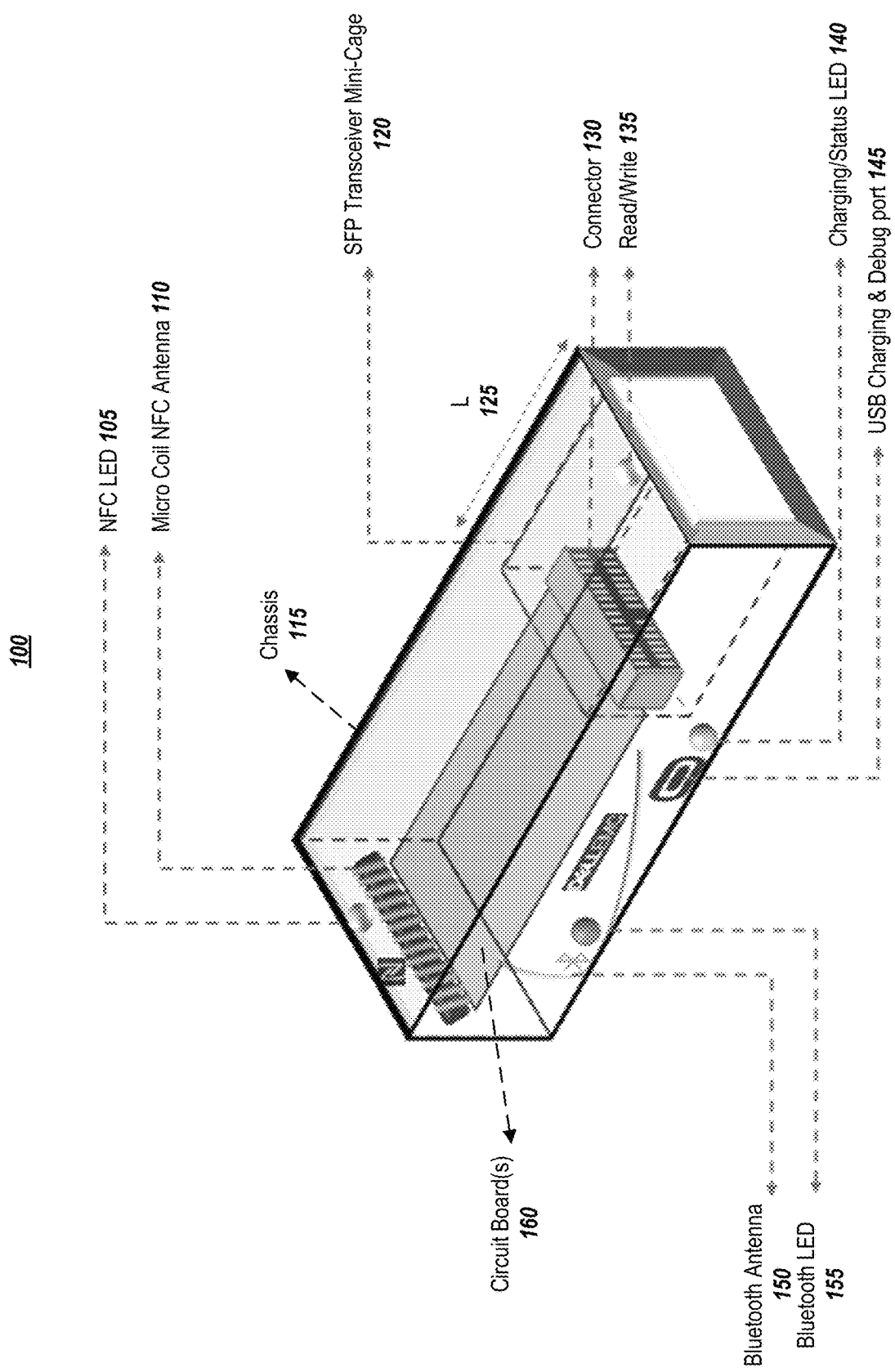
FIG. 1 ("FIG. 1") depicts a compact handheld integrated cabling assist (CHICA) device, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. General Introduction

After racking and powering up of a network, cabling is one of the first and most crucial touchpoint from a customer experience perspective. Cabling issues, such as using an incorrect transceiver, plugging in a transceiver into the wrong port, faulty transceivers, and configuration mismatches, not only impede a customer's development operation but also continues to retain one of the top spots in terms of generating a high number of support calls. To add complexity, the number of network information handling systems (e.g., switches and routers), the number of optics, and the number of direct attached cabling (DAC) components that are qualified and available are ever expanding. Coupled with the vast increase in devices and components is the requirement for supporting more network operating systems (NOS) and their command line interfaces (CLI) options or nuances (e.g., breakout modes, port configurations, etc.).

Note, however, that the staggering arrays of devices, components, and operating systems, are not the only issues that affect cabling in a network. Datacenter support technicians are typically part-time contract employees. These part-time contract employees may have less experience, less familiarity with devices and components, and limited skills. Furthermore, they often work in a time and physically constrained environment and find it difficult to debug cabling issues from a software perspective because they are unfamiliar and not trained in networking platforms, optics, network operating systems, application interfaces, CLIs, and other tools.

To aid datacenter support technicians, machine learning (ML) or artificial intelligence (AI)-powered tools have seen considerable momentum. These tools are easy for support technicians to use—especially in challenging environments (e.g., low lighting, cramped environments, and inability to have hands free). A cabling assist application can gainfully leverage voicebots to improve the agility and efficiency of data center technicians.

However, even if a cabling assist application is convenient to use (e.g., voice enabled), technicians still should validate the transceiver (optics/DAC) that needs to be inserted in the switch port. Various aids may be considered to help with transceiver identification, including near-field communication (NFC) and smart cards.

Near-field communication (NFC) is now a ubiquitous, popular, cost effective, and mature technology. NFC tags (especially passive tags, including on-metal) make it a popular choice for switch and transceiver identification. Micro-coil NFC solenoid antennas with excellent performance characteristics can read tags (e.g., a 9-millimeter (mm) antenna can reach up to 25 mm).

Smart Card reader designs based on systems on a chip (SoC) that have both Bluetooth (BLE) and NFC reader/writer capabilities are available. The readers are currently in use in the mobile banking, health care, and access control domains.

While almost all smartphones today come with an NFC reader, they may not be suitable for reading the tags in this context. There are several situations that limit the usability of smartphones by support technicians in datacenter environments. For example, cable obstructions can prevent access, and the minimum reading distance may not be available. Also, there are other physical limitations or issues; for example, there is a possibility of dropping a smartphone while atop a ladder when trying to cable tops of racks (ToRs). Also, reading transceivers over I2C (a synchronous, packet switched, serial communication bus) or NFC is much faster and error-proof than using a camera to read barcode/QR-codes (e.g., due to faded/damaged codes and/or poor lighting conditions). Thus, it is desirable for technicians to have a lightweight handheld integrated reader that is specifically designed for the cabling use cases rather than having to interact with the smartphone NFC reader and/or camera.

Accordingly, presented herein are embodiments of a compact handheld integrated cabling assist (CHICA) device, which has a transceiver-like form factor, that emulates a port of a network information handling system (e.g., a switch or router) that is to be cabled to ensure that the small form factor pluggable (SFP) or quad-SFP (QSFP) transceiver (optic/DAC) that the technician is going to use is functioning and is the correct transceiver for the port. Thus, a CHICA embodiment may pair with a cabling assist application (CA-App) on an information handling system (e.g., a smartphone) to guide transceiver selection prior to insertion in the networking system. In one or more embodiments, the CA-App uses the data read by the CHICA device to confirm that the transceiver meets the configuration requirements of the switch port. In one or more embodiments, a user may interact with the CA-App to write data (e.g., EEPROM fields or NFC tag) to the transceiver by issuing commands over the CHICA BLE channel. Embodiments may be vendor-agnostic, backward compatible with the current massively deployed transceiver/switch product offerings and facilitate a seamless cabling experience for datacenter technicians.

There are USB/cable-based transceiver products, such as those by CodingBox, GigaLight, Optic Recoder, and MultiLand, that provide testing or coding functionality. However, none of them are portable/technician friendly, nor to the knowledge of the author are any designed to coordinate with an application to emulate a port that is to be cabled. Also, while radio frequency ID (RFID) or NFC readers with Bluetooth paired with smartphones are known, and while cable testers for transceiver validation (which typically connect over USB connection) are also known, there does not exist any devices in the form factor of a transceiver that offers the functionality and ease of use as embodiments disclosed herein. Also, no solutions provide interaction with a smartphone application that has a session with the networking information handling system that has the port that is being emulated for transceiver verification. Furthermore, embodiments also provide portable low-cost solutions that can dramatically reduce cabling issues and resolution of cabling issues.

B. System and Method Embodiments

FIG. 1 depicts a compact handheld integrated cabling assist (CHICA) device, according to embodiments of the present disclosure. As illustrated in FIG. 1, the CHICA device 100 has a form factor similar to that of an optical transceiver, thereby making it easy to use for a technician. In the depicted embodiments, the CHICA device 100 comprises several elements. The depicted embodiment comprises a chassis 115 that houses the component parts of the device. Also depicted is a transceiver mini-cage 120 with a connector 130 that receives either a small form-factor pluggable transceiver directly or an adaptor with a small form-factor pluggable transceiver. In one or more embodiments, the connector communicatively couples one or more signals from the small form-factor pluggable transceiver to a system processor (not depicted in FIG. 1), which may be located on a circuit board 160. Note that the CHICA may comprise one or more circuit boards 160 that comprise various components that provide intelligence and operations for the CHICA, including a system processor, which may be a SoC. The system processor may perform a number of functions, such as receiving one or more signals from the small form-factor pluggable transceiver that is communicatively coupled with the connector of the mini-cage, interfacing with a cabling assist application operating on a separate information handling system, in which the cabling assist application provides an indication to the system processor whether the small form-factor pluggable transceiver is a correct component for a specific port on a network information handling system located at a specific location, and controlling data exchange via one or more communications antennas. More details about embodiments of the inner functional components are provided with reference to FIG. 2, below.

Concerning communications antennas, the CHICA 100 may comprise one or more short-range antennas. For example, the depicted embodiment comprises a Bluetooth antenna 150 and an NFC antenna 110. It shall be noted that other antennas (e.g., WiFi) may also be present (alternatively or additionally).

In one or more embodiments, the CHICA device 100 may include one or more indicators (e.g., a display, speaker, haptics, and/or lights (e.g., single-color or multi-color light emitting diodes (LED))). In the depicted embodiments, there is an LED 105 for indicating NFC functions, a read/write LED 135 (e.g., an I2C read/write) for indicating Input/Output (I/O) exchanges between the CHICA and the transceiver that is connected to the CHICA, and a Bluetooth LED 150 for indicating Bluetooth functions. In one or more embodiments, the CHICA may include an indicator for signaling to a user of the CHICA device whether the transceiver is the correct component for the specific port on the specified network information handling system.

In one or more embodiments, the CHICA device 100 may include a port 145 for functions such as interfacing with the components (e.g., SoC system processor), for charging a battery of a power system for the device 100, or both. Additional functions and/or additional ports may also be present and supported.

In one or more embodiments, the CHICA device may support various transceivers (e.g., SFP/SFP+/SFP28/SFP56 transceivers) with the use of an adaptor (e.g., QSA/QSA28 adaptors). The transceiver (or transceiver plugged into an adapter) may be inserted into the mini-cage 120. In one or more embodiments, the length 125 of the mini-cage is configured such that it does not need to fully receive the transceiver into the mini-cage since it is not a true network switch port. Reducing this dimension helps keep the CHICA device 100 small and more manageable in the hand of a user. In one or more embodiments, the length may be about a third of the transceiver length, but it may be anywhere in a range from a minimum length and to a maximum length. A minimum length may be defined as the shortest length sufficient to securely retain the transceiver (which may include an adaptor) in the CHICA device, when the CHICA device and transceiver are used in a handheld position. And, the maximum length may be defined as a length less than a length used when the transceiver (which may include an adaptor) is fully inserted into a network information handling system—often, the fully inserted length is defined by a standard; thus, the maximum length may be some length less than the standard-defined length.

Figure 2:
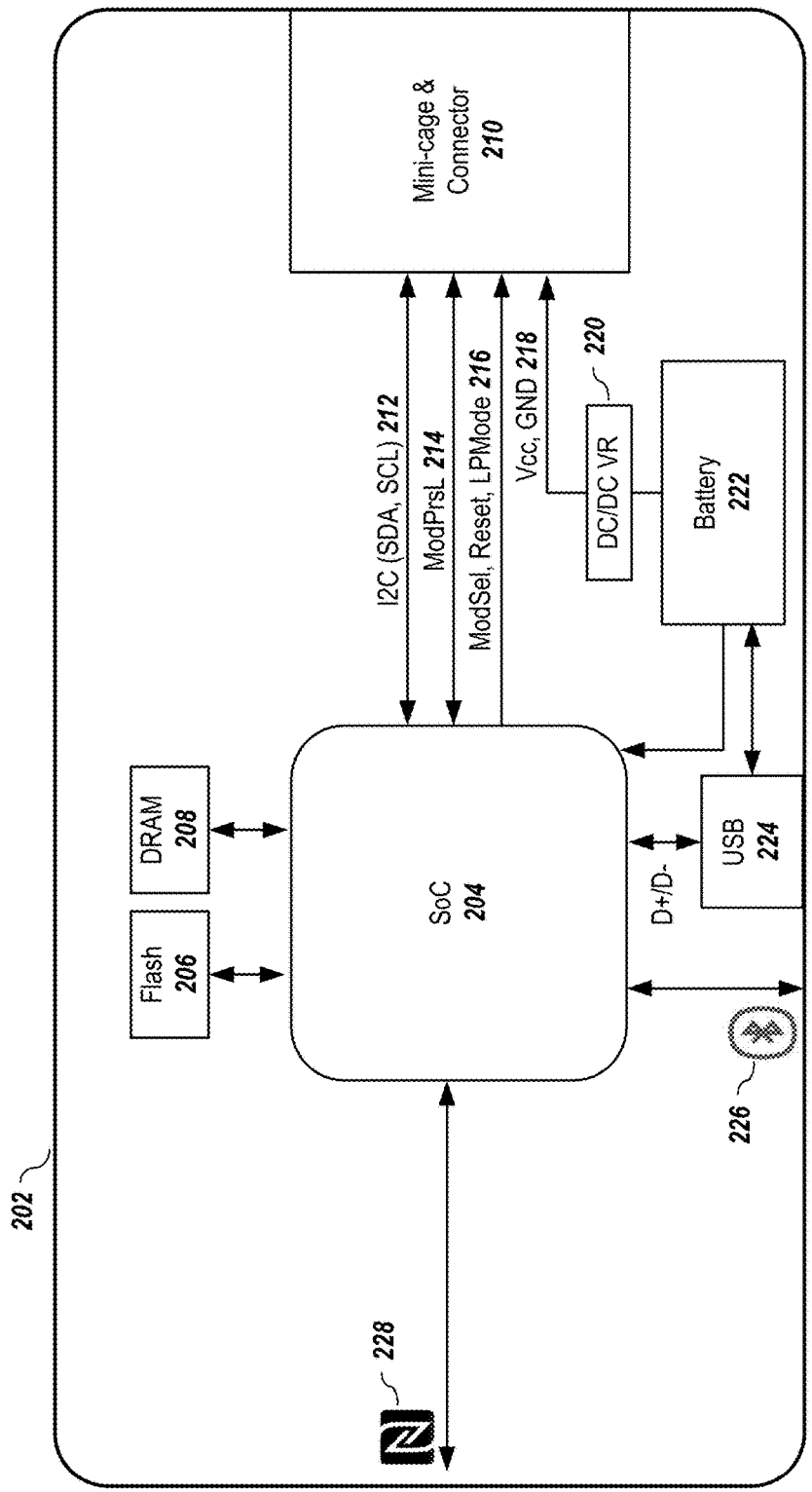
FIG. 2 depicts a functional block diagram of a CHICA device, according to embodiments of the present disclosure.

FIG. 2 depicts a functional block diagram of a CHICA device, according to embodiments of the present disclosure.

In the depicted embodiment, the main component may be on a circuit board 202, such as a printed circuit board (PCB) that provides connective traces for power and data signals between components. As noted previously, the depicted embodiment may comprise one or more circuit boards (e.g., a main board and one or more daughter cards).

Depicted in FIG. 2 is a mini-cage and connector 210 that receives the transceiver—either just a transceiver or an adaptor and transceiver. The connector housed in the mini-cage maps one or more signals from the transceiver to the system processor 204, which may be a system on a chip the provides a number of functions. In one or more embodiments, a number of signals may be communicatively connected from the transceiver to/from the SoC 204 via one or more traces on the PCB, including but not limited to: power (e.g., Vcc and ground (GND) 218, ModPrsL (Module Present) 214, SCL (serial interface clock) 212, SDA (serial interface data) 212, ModSel (module select) 216, Reset 216, LPMode (low power mode) 216. It should be noted that fewer or more connections may be made with the transceiver EEPROM.

As depicted, the CHICA device comprises a power system that provides power to various components, including the system processor 204 and the transceiver when communicatively coupled to the connector of the mini-cage. In one or more embodiments, the power system may comprise a battery 222 and a direct current voltage regulator 220. In one or more embodiments, the CHICA device may include a universal serial bus (USB), such as a micro-USB port, which may be used for a number of functions, including but not limited to providing power to charge the battery 222 and providing access to one or more components, such as debugging the CHICA's firmware with the use of an external information handling system (e.g., a smartphone or computer). In one or more embodiments, the USB port may be used to establish a communication channel with an information handling system (e.g., a smartphone or computer); this communication channel may be used as an alternative to a Bluetooth channel, as discussed below.

In one or more embodiments, a side of the CHICA device may include a Bluetooth antenna 226 (e.g., a Bluetooth Low Energy (BLE) antenna). The Bluetooth antenna may be used to pair with an information handling system, such as a smartphone or computer. As discussed in more detail below, the CHICA device may establish a connection via Bluetooth with a smartphone that is running a cabling assist application, which is used to help with transceiver checking and verification.

In one or more embodiments, a side of the CHICA device may include an NFC antenna (e.g., an NFC micro-coil antenna). The NFC antenna may be used for interfacing with an NFC tag on a transceiver.

While not depicted in FIG. 2, the CHICA device may also include one or more indicators (e.g., a display, speaker, haptics, and/or lights (e.g., single-color or multi-color LEDs)). For example, in one or more embodiments, there may be one or more multi-color LEDs that reflect the status(es) of the USB, BLE, I2C, and NFC functionalities.

As noted already, the system includes one or more processors. In the depicted embodiment, the one or more system processor may be a system on a chip (SoC) 204 that includes or provides a number of functional elements. In one or more embodiments, the SoC 204 has interfaces for interfacing with other system components (e.g., I2C, BLE, NFC, and USB interfaces). The SoC's I2C may be directly mapped to the mini-cage's connector to read the I2C of the transceiver.

The ModPrsL, ModSel, Reset and LPMode may be implemented using general-purpose input/output (GPIO) emulation.

In one or more embodiments, the system 200 may include one or more memory components communicatively coupled to the system processor 204, including flash memory 206, DRAM memory 208, or both. For example, in one or more embodiments, memory may comprise firmware for operating the overall CHICA and for providing or supporting various functions.

It shall be noted that the system 200 may include additional components that are not depicted that are used to support existing features, to provide additional functions, or both.

Figure 3:
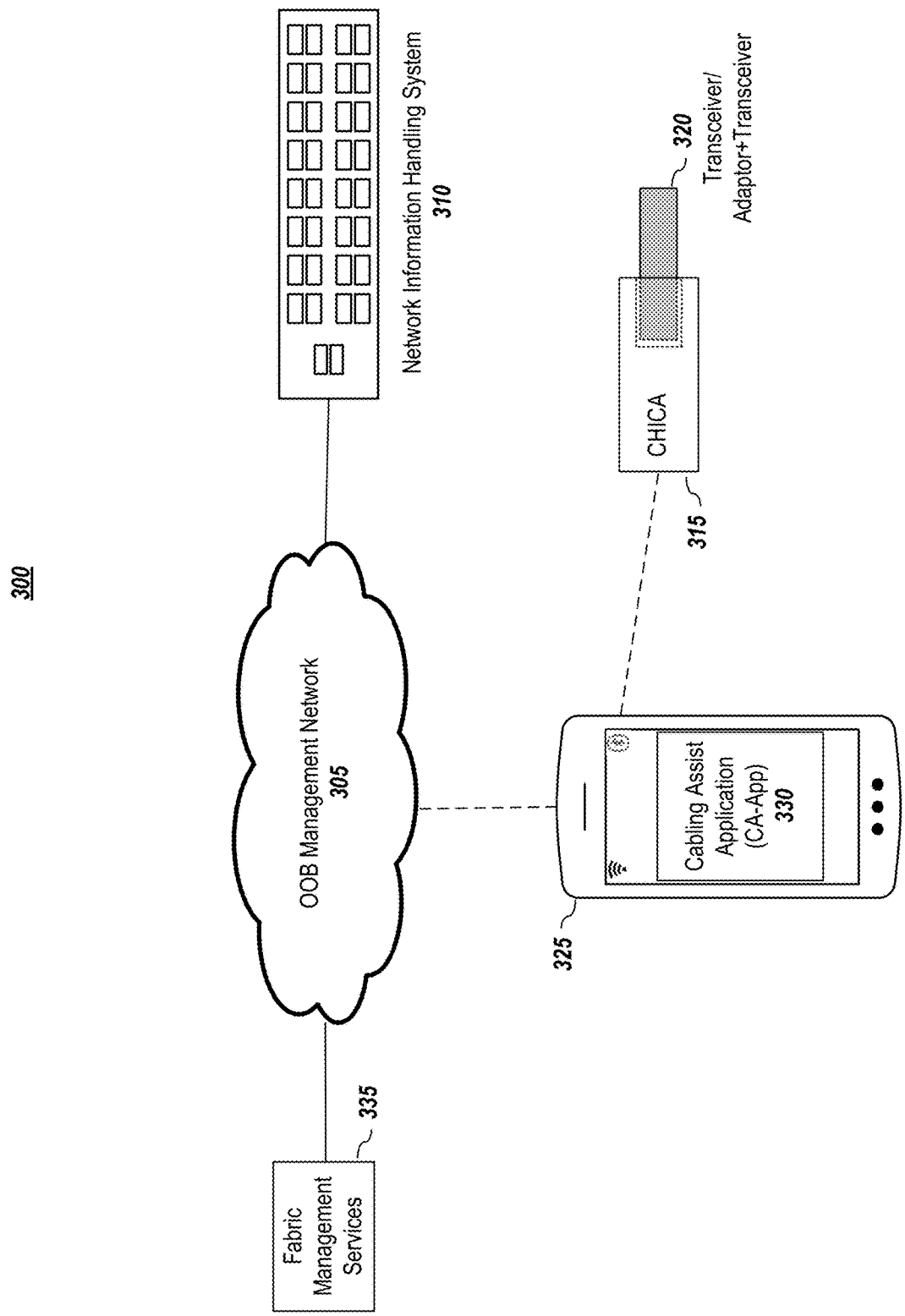
FIG. 3 depicts an environment in which a CHICA device operates, according to embodiments of the present disclosure.
Figure 4:
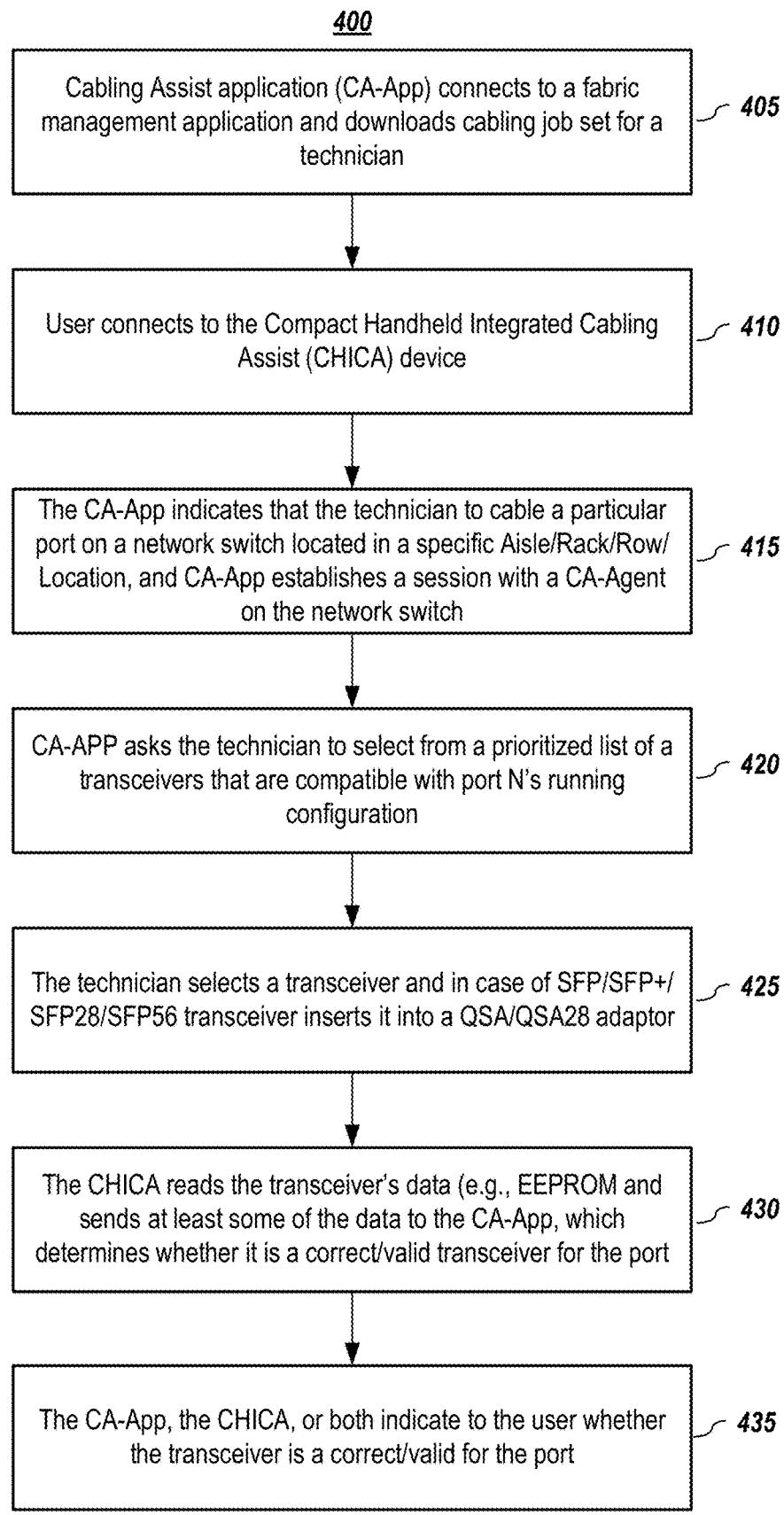
FIG. 4 depicts a methodology for using a CHICA device, according to embodiments of the present disclosure.

FIG. 3 depicts an environment in which a CHICA device operates, according to embodiments of the present disclosure, and FIG. 4 depicts a methodology for using a CHICA device, according to embodiments of the present disclosure. In one or more embodiments, a user opens a cabling assist application 330 (hereinafter, CA-App) on their smartphone 325, and the CA-App connects (405) to a fabric management application (e.g., Smart Fabric Services by DELL® Inc. of Round Rock, Texas, USA). In the depicted embodiment of FIG. 3, the CA-App 330 connects to the fabric management services 335 over an Out-of-Band (OOB) management network using WiFi and downloads (405) a cabling job sheet for the technician/user. The user may pair/connect (410) the CHICA device with the smartphone's CA-App by using Bluetooth or a WiFi connection. In one or more embodiments, the CA-App indicates (415) that the technician is set to cable a particular port on a networking switch located in a specific Aisle/Rack/Row/Location in a facility, such as a datacenter. It should be noted that the CA-App may also establish a session with a CA-Agent on the network information handling system 310.

Figure 5:
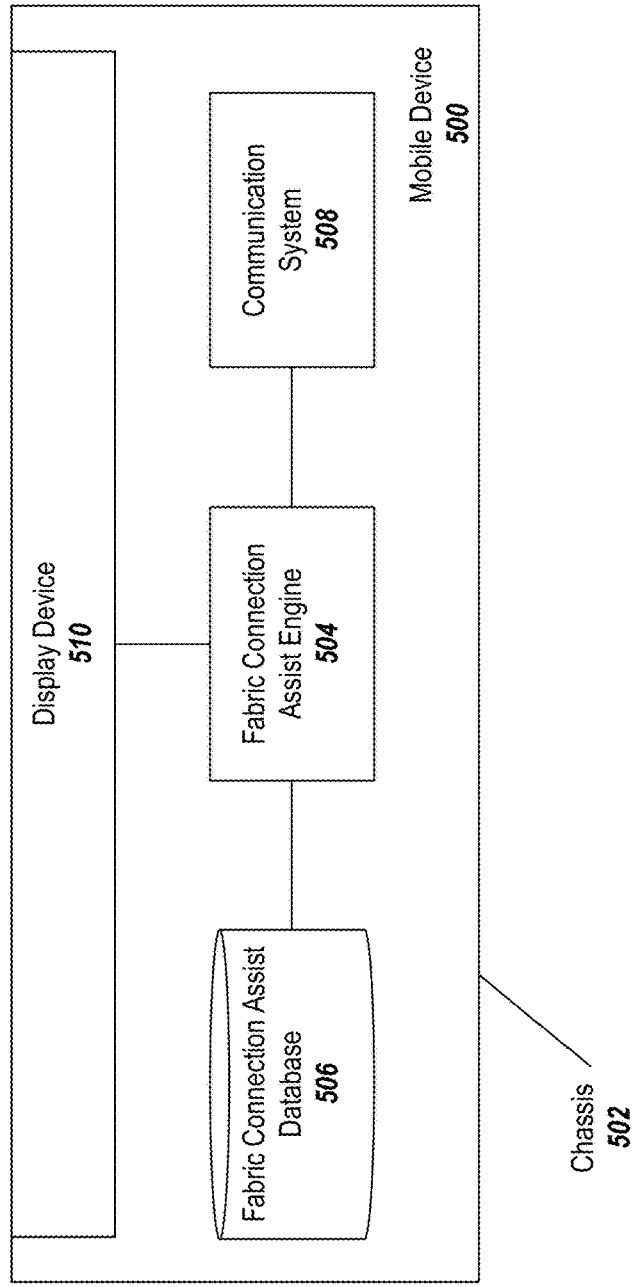
FIG. 5 illustrates a mobile device that may be the mobile device illustrated with reference to FIG. 3, according to embodiments of the present disclosure.
Figure 6:
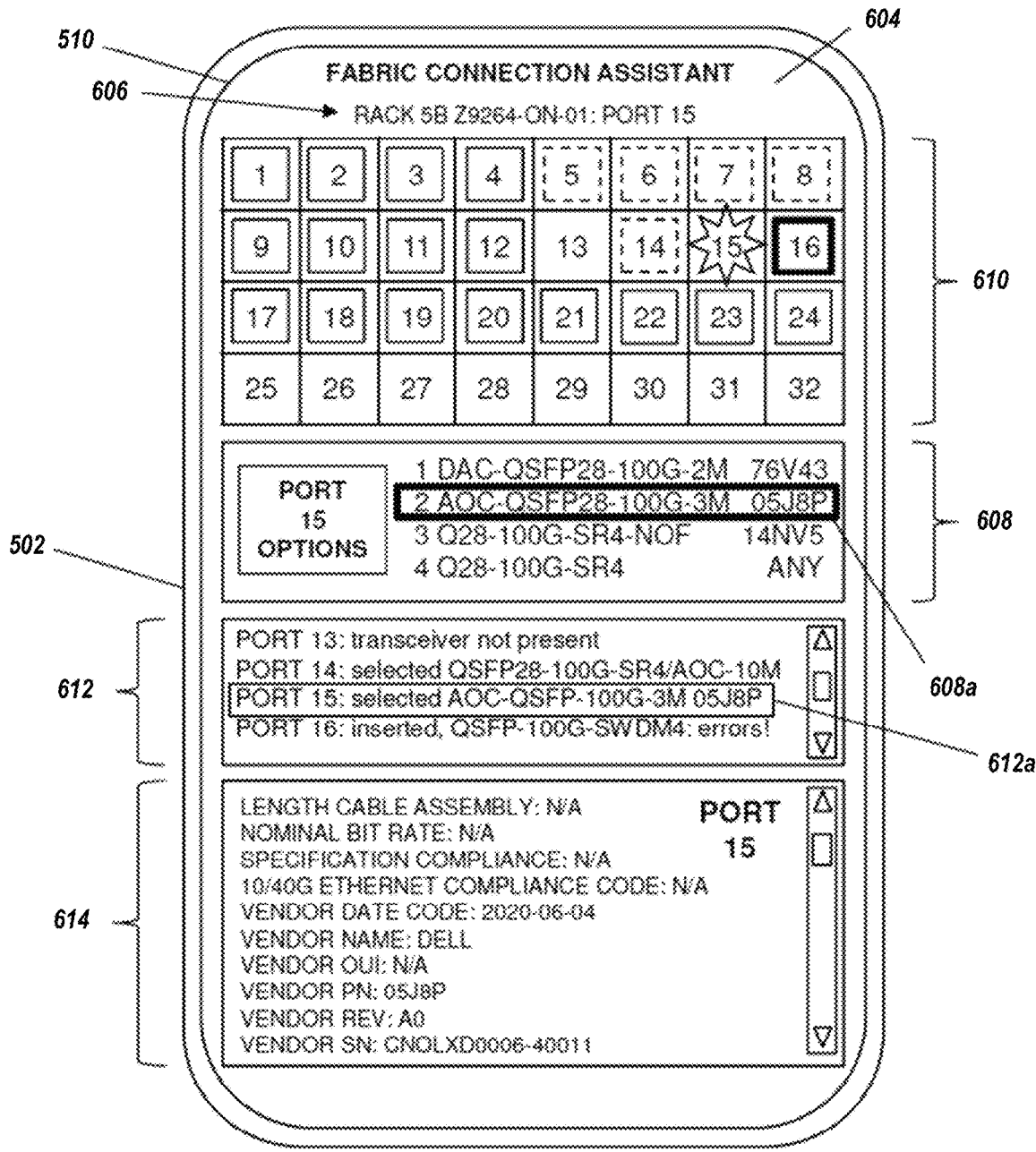
FIG. 6 depicts another view of the mobile device of FIG. 5, according to embodiments of the present disclosure.

In one or more embodiments, the CA-App may be one the same as or similar to that described in co-pending and commonly-owned U.S. patent application Ser. No. 17/233,072, filed on 16 Apr. 2021, entitled "FABRIC CONNECTION ASSIST SYSTEM," and listing Padmanabhan Narayanan, Ming Chung Chow, and Ramar Nagaraj as inventors, which patent document is incorporated by reference herein in its entirety. Referring now to FIGS. 5 and 6, FIG. 5 depicts a functional view a mobile device with a cabling assist application (CA-App), according to embodiments of the present disclosure, and FIG. 6 illustrates an embodiment of the mobile device with a CA-App, according to embodiments of the present disclosure.

FIG. 5 illustrates a mobile device 500 that may be the mobile device 325 illustrated with reference to FIG. 3. As such, the mobile device 500 may be implemented as an information handling system, embodiments of which are discussed below in Sec. C and may include some or all of the components discussed in that section. In the specific examples discussed below, the device is described as being provided by a mobile phone; however, while illustrated and discussed as being provided by a mobile phone, one of skill in the art shall recognize that the functionality of the mobile device 500 may be provided by other devices (e.g., tablet computing devices, laptop/notebook computing devices, etc.) that are configured to operate similarly as the mobile device 500 discussed herein.

In the illustrated embodiment, the mobile device 500 includes a chassis 502 that houses the components of the mobile device 500; for brevity, only some of the components are illustrated and discussed herein. For example, the chassis 502 may house a processing system and a memory system that is coupled to the processing system and that includes instructions that, when executed by the processing system, cause the processing system to provide a fabric connection assist engine 504 that is configured to perform the functionality of the fabric connection assist engines and/or mobile devices to provide the fabric connection assist application. In one or more embodiments, the fabric connection assist engine 504 may provide a fabric connection assist application on the mobile device 500 that performs some or all of the functionality of the fabric connection assist engine 504, although one of skill in the art shall appreciate that the functionality of the fabric connection assist engine 504 may be provided in a variety of manners that will fall within the scope of the present disclosure as well.

The chassis 502 may also house a storage system (not illustrated) that is coupled to the fabric connection assist engine 504 (e.g., via a coupling between the storage system and the processing system) and that includes a fabric connection assist database 506 that is configured to store any of the information utilized by the fabric connection assist engine 504 discussed below. The chassis 502 may also house a communication system 508 that is coupled to the fabric connection assist engine 504 (e.g., via a coupling between the communication system 508 and the processing system) and that may be provided by a Network Interface Controller (NIC), wireless communication systems (e.g., Bluetooth, NFC components, WiFi components, etc.), and/or any other communication components that would be apparent to one of skill in the art. As such, the communication system 508 may provide for the connection (e.g., a wireless connection such as a WiFi connection) of the mobile device 500 to a management network provided by a network and to the CHICA device.

The chassis 502 may also house a display device 510 that is coupled to the fabric connection assist engine 504 (e.g., via a coupling between the display device 510 and the processing system) and that is configured to display information.

While a specific mobile device 500 has been illustrated and described, one of skill in the art shall recognize that mobile devices (or other devices operating according to the teachings of the present disclosure in a manner similar to that described below for the mobile device 500) may include a variety of components and/or component configurations for providing conventional mobile device functionality, as well as the functionality discussed below, while remaining within the scope of the present disclosure as well.

FIG. 6 depicts another view of the mobile device 500 of FIG. 5, according to embodiments of the present disclosure. In the illustrated embodiment, the fabric connection assist engine 504 in the mobile device 325/500 may receive the identification of the transceiver device(s) and/or direct-attach cabling supported by a port of a network information handling system (e.g., switch 310 in FIG. 3) in the network (and may also receive port configuration information) via its communication system 508. In one or more embodiments, the fabric connection component identification operations may include a fabric connection assist engine or agent (not depicted) in the network information handling system (e.g., switch 310 in FIG. 3) using the fabric connection information in a storage memory (e.g., a fabric connection assist database, which may be stored in the agent or on the device 310) to determine the cabling options and/or other fabric connection components for its port that is currently being connected to the fabric, and transmitting identifying those cabling options and/or other fabric connection components in the fabric connection component identification communication transmitted via its communication system and through the network 305 to the mobile device 325.

With reference to FIG. 6, in an embodiment of block 504, the fabric connection assist engine 504 in the mobile device 500 may utilize fabric plan information received from a fabric management system (e.g., fabric management services 335 in FIG. 3) to provide a fabric connection assist screen 604 on its display device 510. In the embodiment illustrated in FIG. 6, the fabric connection assist screen 604 includes a fabric device connection operation identifier 606 that identifies a port on the network information handling system 310 (e.g., port "15" on switch device "Z9294F-ON-01" in rack "5B" in this example) that the fabric connection technician should connect to the fabric and, the fabric connection assist engine 504 may utilize the fabric plan information/job plan provided to the mobile device 325/500 to prioritize the connection of ports on fabric devices detailed in that fabric plan information/job plan in order to guide the fabric connection technician through fabric connections in an efficient manner.

As such, subsequent to the launching of the fabric connection assistant engine 504 on the mobile device and the retrieving of the fabric plan information from the fabric management system, the fabric connection assist screen 604 may include the current port identifier 606 that identifies the port on the fabric device 310 that should currently be connected to the fabric (e.g., port "15" on switch device "ZMS21-0101-0601-03T0" in rack "5B"), which one of skill in the art shall recognize allows the fabric connection technician to identify the port on the fabric device 310 that they should currently be connecting to the fabric. Furthermore, subsequent to receiving the fabric connection component identification communication from the fabric device 310 that includes the port that is currently being connected to the fabric, the fabric connection assist screen 604 may display a supported fabric connection component section 608 that displays a prioritized list of transceivers that are compatible with the specified port's running configuration: preferred part numbers (e.g., DAC-QSFP28-100G-2M 76V43) and/or preferred transceiver types: AOC-QSFP28-100G-3M, Q28-100G-SR4-NOF (with "ANY" wildcard). In the depicted example, the user may indicate a component 608a that has been selected by the user, or alternatively, the supported fabric connection component section 608 may be configured to provide an identified fabric connection component indicator 608a to indicate a fabric connection component (e.g., a direct-attach cable in the illustrated example) that should be used for connection to the port that is currently being connected to the fabric.

The fabric connection assist screen 604 may also include a port connection status section 610 that identifies the ports (e.g., port identifiers 1-32) on the fabric device 310 that includes the port that is currently being connected to the fabric, and includes port status indicators that indicate the status of the connection of each of the ports on that fabric device 310 to the fabric. In the illustrated example, each of the port identifiers 1-4, 9-12, and 17-24 includes a first indication (illustrated by a solid box, but which may be provided by a particular color (e.g., green)) that indicates to the fabric connection technician that the ports associated with those port identifiers have been successfully connected to an identified fabric connection component. Furthermore, the illustrated example provides each of the port identifiers 5-8 and 14 including a second indication (illustrated by a dashed box, but which may be provided by a particular color (e.g., purple)) that indicates to the fabric connection technician that the ports associated with those port identifiers have had fabric connection component identified for connection to them.

Further still, the illustrated example provides the port identifier 16 including a third indication (illustrated by a bolded box, but which may be provided by a particular color (e.g., red)) that indicates to the fabric connection technician that the port associated with that port identifier have had a fabric connection component connected to it and is associated with one or more errors. Yet further still, the illustrated example provides the port identifier 15 including a fourth indication (illustrated by an eight-point star, but which may be provided by a particular color (e.g., blue)) that indicates to the fabric connection technician that the port associated with that port identifier is currently being connected to the fabric. Yet further still, the illustrated example provides the port identifiers 13 and 25-32 with no indication to indicate to the technician that the port associated with that port identifier does not have a fabric connection component connected, nor have they had a fabric connection component identified for connection to them. However, while a particular port connection status section 610 on the fabric connection assist screen 604 is illustrated and described, one of skill in the art shall appreciate how the connection status for port to the fabric may be indicated in a variety of manners that would be apparent to one of skill in the art in possession of the present disclosure.

In one or more embodiments, the fabric connection assist screen 604 may also include a port connection information section 612 that provides information about the connection of ports on the fabric device 310 that includes the port that is currently being connected to the fabric. As such, in the specific example illustrated in FIG. 6, the port connection information section 612 includes information about port identifier 13 (e.g., indicated that a fabric connection component has not connected or identified for that port), port identifier 14 (e.g., identifying a identified fabric connection component for that port), port identifier 15 (e.g., identifying a identified fabric connection component device for that port), and port identifier 16 (identifying a connected fabric connection component for that port that has errors). Furthermore, one of skill in the art shall appreciate that the port connection information section 612 may be a scrollable section that allows information about the connection of any of the ports on the fabric device 310 to be viewed by the fabric connection technician. In one or more embodiments, the port connection information section 612 may be configured to provide an identified fabric connection component indicator 612a to indicate a fabric connection component (e.g., a direct-attach cable in the illustrated example) that has been identified for connection to the port that is currently being connected to the fabric.

In one or more embodiments, the fabric connection assist screen 604 may also include a port information section 614 that provides information about the port on the fabric device 310 that is currently being connected to the fabric. As such, in the specific example illustrated in FIG. 6, the port information section 614 may include information about a transceiver module connected to port 15, such as a length cable assembly, a nominal speed, a transceiver specification compliance identifier, a 10/25/40/100G ethernet compliance identifier, a module date code, a vendor name, a vendor Organizationally Unique Identifier (OUI), a vendor Part Number (PN), a vendor revision (REV), and a vendor Serial Number (SN) Furthermore, one of skill in the art shall appreciate that the port information section 614 may be a scrollable section that allows additional information about the port 15 to be viewed by the technician. However, while a specific fabric connection assist screen 604 has been illustrated and described, one of skill in the art shall appreciate how fabric connection assist screens provided according to the teachings of the present disclosure may provide a variety of other information, which falls within the scope of the present disclosure as well.

Returning to FIG. 4, in one or more embodiments, the CA-APP asks (420) the technician to select from a list (e.g., a prioritized list) of transceivers 608 that are compatible with the specified port's configuration. In one or more embodiments, the technician selects (425) a transceiver, and in case of SFP/SFP+/SFP28/SFP56 transceiver inserts it into a QSA/QSA28 adaptor.

The transceiver/adaptor may be inserted into the mini-cage of the CHICA device, and the CHICA device reads (430) the transceiver's data (e.g., EEPROM over the I2C interface). At least some of the data may be sent (430) to the CA-App, which determines whether it is a valid transceiver for the specific port. For example, after the transceiver data is read, the contents may be transferred to the CA-App over the BLE channel, and the CA-App validates the transceiver against the switch port's configuration and may suggest further cabling options (e.g., type of cable, straight vs. breakout cabling, multi-mode fiber (MMF), single-mode fiber (SMF), etc.)).

In one or more embodiments, the CHICA may receive from the CA-App an indication whether the transceiver is a correct/valid for the port. For example, a sound, light, motion, and/or other indicator(s) may be used to alert (435) the user regarding whether the selected transceiver is accepted or not. Additionally, or alternatively, a sound, light, motion, and/or other indicator(s) may be triggered (435) on the smartphone 325 via the CA-App rather than on the CHICA device to alert the technician regarding whether the transceiver is correct for the port.

In embodiments in which a transceiver has an NFC tag embossed in-lieu of barcodes/QR-codes, the technician may tap the transceiver's tag near the CHICA's NFC antenna to read the transceiver information. The NFC tag may be embedded in or on it (or in or on a handle or tab).

Figure 7:
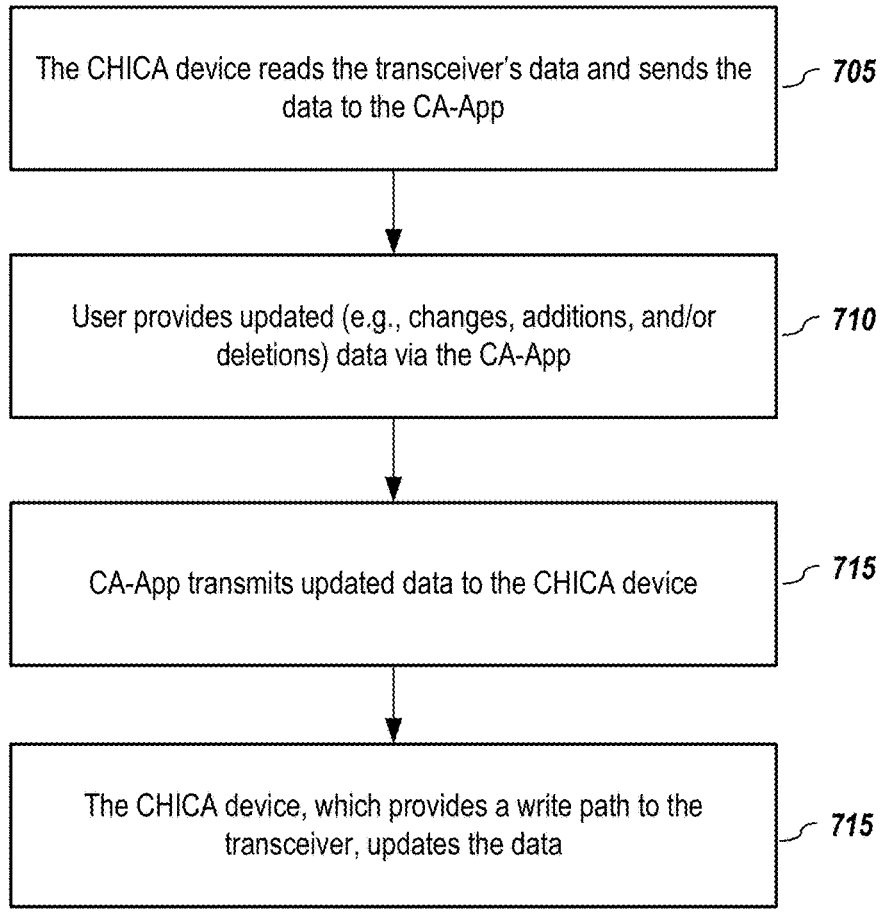
FIG. 7 depicts a methodology for writing to a transceiver, according to embodiments of the present disclosure.

In one or more embodiments, the CHICA device may also provide a write path to control/write to the transceiver. FIG. 7 depicts a methodology for writing to a transceiver, according to embodiments of the present disclosure. The CHICA device reads the transceiver's data and sends (715) the data to the CA-App. The data may be read via being connected to the connector in the mini-cage or by NFC tag reader. In one or more embodiments, the user provides (710) updated data (e.g., changes, additions, and/or deletions) via the CA-App, and the CA-App transmits (715) the updated data to the CHICA device. The CHICA device, which provides a write path to the transceiver, updates the data either via data path on the connecter (e.g., I2C to the EEPROM) or to the NFC tag. For example, if a user/technician wants to write annotations in the form of user-defined TLV fields (e.g., to mark the transceiver as faulty), they may use the CA-App via a voice, text, upload, or other interface to input the updated data that is then written to the transceiver by the CHICA device.

Figure 8:
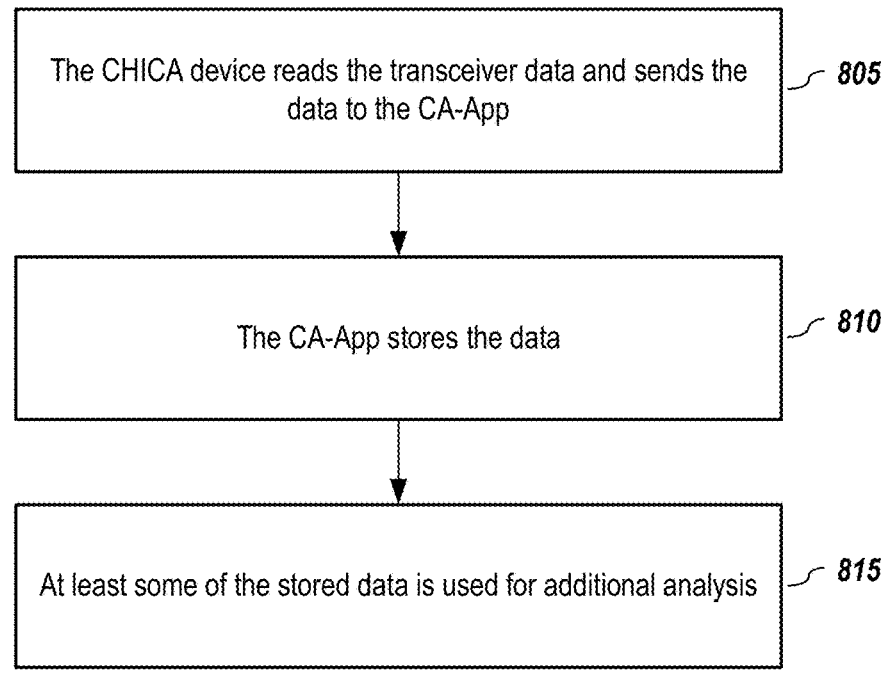
FIG. 8 depicts a method for using collected and using transceiver-related data, according to embodiments of the present disclosure.

In one or more embodiments, the data collected for the transceivers may be used for other purposes. FIG. 8 depicts a method for using collected and using transceiver-related data, according to embodiments of the present disclosure. The CHICA device reads the transceiver data (e.g., via the EEPROM or NFC tag) and sends the data to the CA-App. In one or more embodiments, the CA-App stores (810) at least some of the data, and at least some of the stored data may be used (815) for additional analysis. For example, the data may be used in data analysis and machine learning analysis to determine a number of different factors, such as failure rates of transceivers, configuration types, usage rates, etc.

C. Information Handling System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 9:
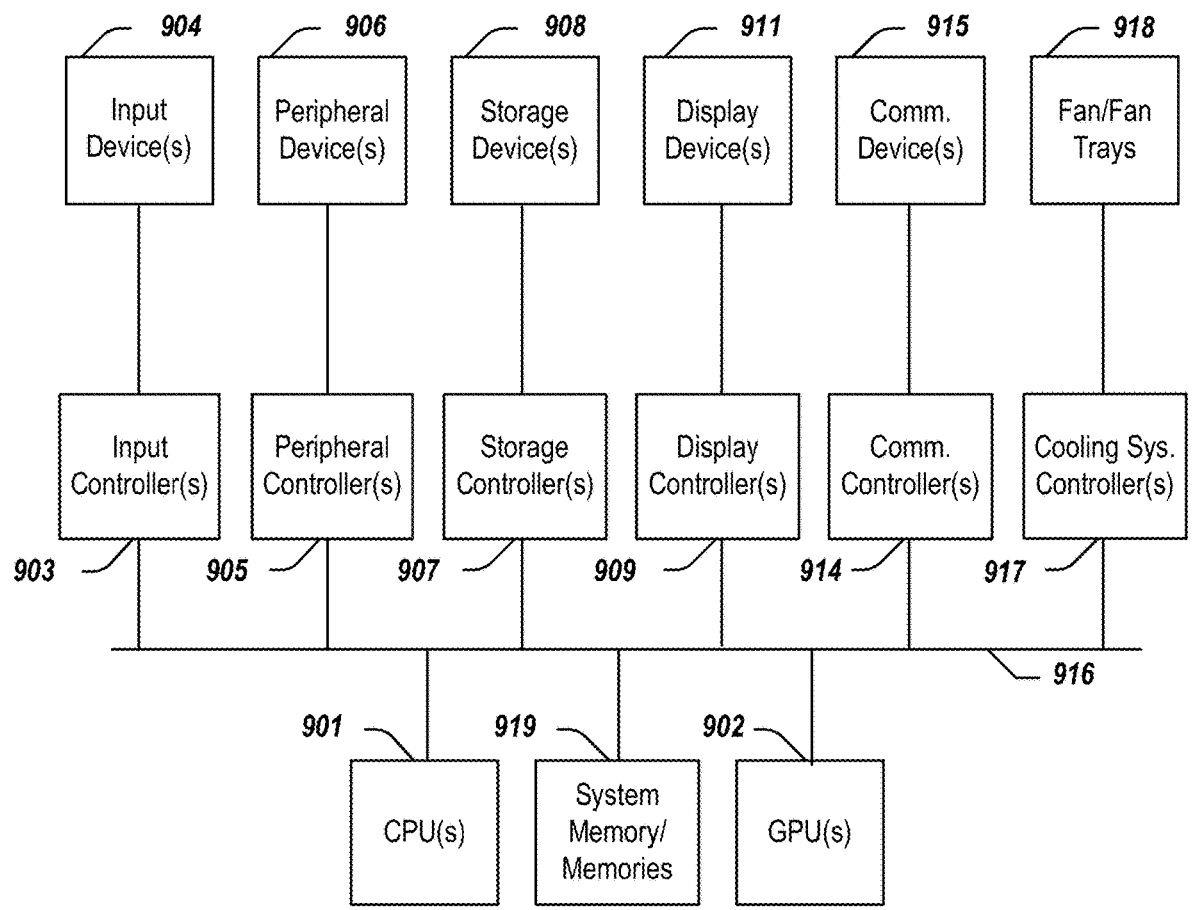
FIG. 9 depicts a simplified block diagram of an information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like and may also include one or more graphics processing units (GPU) 902 and/or a floating-point coprocessor for mathematical computations. In one or more embodiments, one or more GPUs 902 may be incorporated within the display controller 909, such as part of a graphics card or cards. The system 900 may also include a system memory 919, which may comprise RAM, ROM, or both.

A number of controllers and peripheral devices may also be provided, as shown in FIG. 9. An input controller 903 represents an interface to various input device(s) 904, such as a keyboard, mouse, touchscreen, stylus, microphone, camera, trackpad, display, etc. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 10:
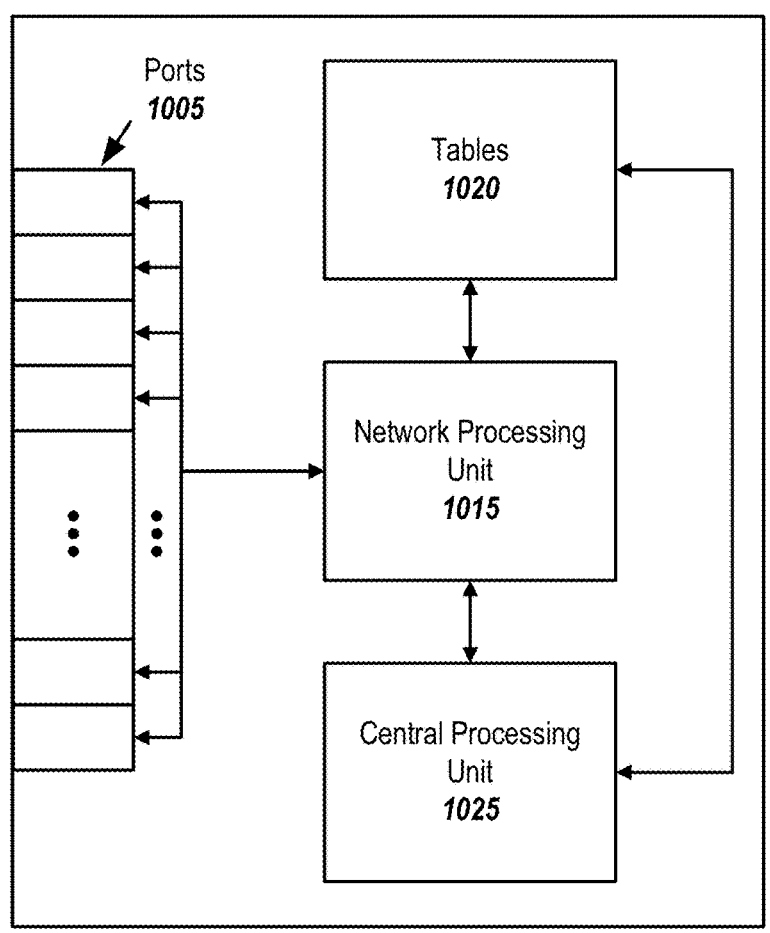
FIG. 10 depicts an alternative block diagram of an information handling system, according to embodiments of the present disclosure.

FIG. 10 depicts an alternative block diagram of an information handling system, according to embodiments of the present disclosure. It will be understood that the functionalities shown for system 1000 may operate to support various embodiments of the present disclosure—although it shall be understood that such system may be differently configured and include different components, additional components, or fewer components.

The information handling system 1000 may include a plurality of I/O ports 1005, a network processing unit (NPU) 1015, one or more tables 1020, and a CPU 1025. The system includes a power supply (not shown) and may also include other components, which are not shown for sake of simplicity.

In one or more embodiments, the I/O ports 1005 may be connected via one or more cables to one or more other network devices or clients. The network processing unit 1015 may use information included in the network data received at the node 1000, as well as information stored in the tables 1020, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A cabling assist device comprising:
a communications antenna;
a mini-cage with a connector for receiving a small form-factor pluggable transceiver or an adaptor with a small form-factor pluggable transceiver, in which the connector communicatively couples one or more signals from the small form-factor pluggable transceiver to a system processor;
the system processor configured to:
receive one or more signals from the small form-factor pluggable transceiver that is communicatively coupled with the connector of the mini-cage;
interface with a cabling assist application operating on a separate information handling system, in which the cabling assist application provides an indication to the system processor whether the small form-factor pluggable transceiver is a correct component for a specific port on a separate network information handling system located at a specific location; and
controlling data exchange via the communications antenna;
an indicator for signaling to a user of the cabling assist device whether the small form-factor pluggable transceiver is the correct component for the specific port on the network information handling system located at the specific location;
one or more memory components communicatively coupled to the system processor;
a power system that provides power to the system processor and to the small form-factor pluggable transceiver when communicatively coupled to the connector of the mini-cage; and
a port for interfacing with the system processor, for charging a battery of the power system, or both; and
a chassis that houses at least the mini-cage, the system processor, the power system, and the one or more memory components and that is sized to be held within a hand of a user.

2. The cabling assist device of claim 1 wherein:
the mini-cage's length for receiving the small form-factor pluggable transceiver or the adaptor with the small form-factor pluggable transceiver is at least less than a length used when the small form-factor pluggable transceiver or the adaptor with the small form-factor pluggable transceiver is fully inserted into a network information handling system.

3. The cabling assist device of claim 1 wherein the communications antenna comprises at least one of the following:
a Bluetooth Low Energy (BLE) antenna; and
a near-field communication (NFC) antenna, communicatively coupled to the system processor, for obtaining information about a small form-factor pluggable transceiver via an NFC tag on the small form-factor pluggable transceiver.

4. The cabling assist device of claim 1 wherein the indicator for signaling to the user of the cabling assist device whether the small form-factor pluggable transceiver is the correct component for the specific port comprises:
a visual indicator, an auditory indicator, or both.

5. The cabling assist device of claim 1 further comprising:
a display or one or more light emitting diodes (LEDs) that indicates a status of at least one or more functionalities of the cabling assist device.

6. The cabling assist device of claim 1 wherein the system processor is further configured to perform steps comprising:
receiving information about the small form-factor pluggable transceiver that is communicatively coupled to the cabling assist device;
communicating at least some of the information to the cabling assist application;
receiving updated information about the small form-factor pluggable transceiver from the cabling assist application; and
sending the updated information to a memory storage on the small form-factor pluggable transceiver.

7. The cabling assist device of claim 6 wherein the step of sending the updated information to a memory storage on the small form-factor pluggable transceiver comprises at least one of:
storing the updated information on an electrically erasable programmable read-only memory (EEPROM) of the small form-factor pluggable transceiver; and
storing the updated information on an NFC tag on the small form-factor pluggable transceiver.

8. A compact handheld cabling assist device comprising:
a short-range antenna;
a mini-cage with a connector for receiving a small form-factor pluggable transceiver or an adaptor with a small form-factor pluggable transceiver, in which the connector communicatively couples one or more signals from the small form-factor pluggable transceiver to at least one processor of one or more processors and the mini-cage has a maximum length less than a length used when the small form-factor pluggable transceiver or the adaptor with the small form-factor pluggable transceiver is fully inserted into a network information handling system;
one or more processors;
a non-transitory computer-readable medium or media comprising one or more sets of instructions which, when executed by at least one of the one or more processors, causes steps to be performed comprising:
receive one or more signals from the small form-factor pluggable transceiver that is communicatively coupled with the connector of the mini-cage;
interface with a cabling assist application operating on a separate information handling system that provides whether the small form-factor pluggable transceiver is a correct component for a specific port on a separate network information handling system located at a specific location; and
controlling data exchange via the short-range antenna;
a power system that provides power to the one or more processors, to the short-range antenna, and to the small form-factor pluggable transceiver when fully seated in the mini-cage; and
a chassis that houses at least the mini-cage, the one or more processors, and the one or more memory component and is sized to be held within a hand of a user.

9. The cabling assist device of claim 8 wherein the short-range antenna comprises:
a Bluetooth Low Energy (BLE) antenna, which is used to interface with the cabling assist application operating on the separate information handling system.

10. The cabling assist device of claim 8 further comprising:
a near-field communication (NFC) antenna, communicatively coupled to at least one of the one or more processors, for obtaining information about a small form-factor pluggable transceiver that is stored on an NFC tag on the small form-factor pluggable transceiver.

11. The cabling assist device of claim 8 further comprising:
a connection port for interfacing with at least one of the one or more processors, for charging a battery of the power system, or both.

12. The cabling assist device of claim 8 further comprising:
a display or one or more LEDs that indicate a status of at least one or more functionalities of the cabling assist device.

13. The cabling assist device of claim 8 wherein the system processor is further configured to perform steps comprising:
receiving information about the small form-factor pluggable transceiver that is communicatively coupled to the cabling assist device;
communicating at least some of the information to the cabling assist application;
receiving updated information about the small form-factor pluggable transceiver from the cabling assist application; and
sending the updated information to a memory storage on the small form-factor pluggable transceiver.

14. A method for using a compact handheld cabling assist device, the method comprising:
coupling a small form-factor pluggable transceiver, or an adaptor with the small form-factor pluggable transceiver, to a connector of a compact handheld integrated cabling assist (CHICA) device that comprises:
a short-range antenna;
a mini-cage with the connector for receiving the small form-factor pluggable transceiver or the adaptor with a small form-factor pluggable transceiver, in which the connector communicatively couples one or more signals from the small form-factor pluggable transceiver to at least one processor of one or more processors;
the one or more processors;
a non-transitory computer-readable medium or media comprising one or more sets of instructions;
a power system that provides power to the one or more processors, to the short-range antenna, and to the small form-factor pluggable transceiver when fully seated in the mini-cage; and
a chassis that houses at least the mini-cage, the one or more processors, and the one or more memory component and is sized to be held within a hand of a user;
receiving, by at least one of the one or more processors of the CHICA device, one or more signals from the small form-factor pluggable transceiver communicatively coupled with the connector;
communicating, via the short-range communications antenna, data about the small form-factor pluggable transceiver, or about the adaptor with the small form-factor pluggable transceiver, to a cabling assist application;
receiving, from the cabling assist application, a determination whether the small form-factor pluggable transceiver, or the adaptor with the small form-factor pluggable transceiver, is a correct component for deployment in a specified port of a separate network information handling system.

15. The method of claim 14, further comprising:
providing, by the CHICA device or the cabling assist application, an indication to a user whether the small form-factor pluggable transceiver, or the adaptor with the small form-factor pluggable transceiver, is correct for the specified port of the separate network information handling system.

16. The method of claim 15, wherein the indication to the user comprises at least one of:
a visual indication using a light-emitting diode (LED) on the CHICA device;
an auditory indication provided by the cabling assist application; or
a haptic indication on the CHICA device.

17. The method of claim 14, further comprising:
writing, using the CHICA device, updated information to a memory of the small form-factor pluggable transceiver based on data received from the cabling assist application.

18. The method of claim 14, wherein the communicating step comprises transmitting data via at least one of:
a Bluetooth Low Energy (BLE) antenna; or
a near-field communication (NFC) antenna configured to obtain information from an NFC tag associated with the transceiver.

19. The method of claim 14, further comprising:
storing data associated with the small form-factor pluggable transceiver; and
performing analysis using the stored data to determine one or more parameters or metrics associated with the small form-factor pluggable transceiver.

20. The method of claim 19 wherein the one or more parameters or metrics associated with the small form-factor pluggable transceiver comprises one or more of: failure rate, configuration type, and usage rates.

* * * * *